United States Patent
Kanemaru et al.

(10) Patent No.: US 9,563,982 B2
(45) Date of Patent: Feb. 7, 2017

(54) IMAGE GENERATING DEVICE, IMAGE GENERATING METHOD, PROGRAM, AND COMPUTER-READABLE INFORMATION STORAGE MEDIUM

(71) Applicant: Sony Computer Entertainment Inc., Tokyo (JP)

(72) Inventors: Yoshikatsu Kanemaru, Tokyo (JP); Fumiteru Sato, Tokyo (JP); Yuichi Nishizawa, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 59 days.

(21) Appl. No.: 14/612,579

(22) Filed: Feb. 3, 2015

(65) Prior Publication Data
US 2015/0243084 A1 Aug. 27, 2015

(30) Foreign Application Priority Data
Feb. 25, 2014 (JP) .................................. 2014-034249

(51) Int. Cl.
*G06T 19/00* (2011.01)
*G06K 9/00* (2006.01)
*H04N 9/76* (2006.01)
*G06K 9/28* (2006.01)
*H04N 5/222* (2006.01)
*H04N 5/262* (2006.01)

(52) U.S. Cl.
CPC ......... *G06T 19/006* (2013.01); *G06K 9/00624* (2013.01); *G06K 9/00691* (2013.01); *G06K 9/28* (2013.01); *H04N 9/76* (2013.01); *H04N 5/2224* (2013.01); *H04N 5/2621* (2013.01)

(58) Field of Classification Search
CPC .................................................. G06T 19/006
See application file for complete search history.

(56) References Cited

U.S. PATENT DOCUMENTS

2012/0075484 A1* 3/2012 Kawamoto ........... G06T 19/006
348/207.1

FOREIGN PATENT DOCUMENTS

JP 2012-069074 4/2012
JP 2013-214158 10/2013

OTHER PUBLICATIONS

NPL: the elements of Art by Matt Fussell, Nov. 13, 2013.*
Notification of Reason for Refusal dated Dec. 1, 2015 from corresponding Application No. 2014-034249.

* cited by examiner

*Primary Examiner* — Devona Faulk
*Assistant Examiner* — Kevin Wu
(74) *Attorney, Agent, or Firm* — Katten Muchin Rosenman LLP

(57) ABSTRACT

An image generating device includes a background image acquirer that acquires an image of a background on which an image of an object is to be superimposed, a color extractor that extracts a color about one or a plurality of places in the image of the background, and a light source decider that decides the color of light output by a light source that illuminates the object based on the color extracted about the one or plurality of places. The image generating device further includes a drawing section that draws the image of the object based on the decided color of the light of the light source and an output image generator that generates an output image obtained by superimposing the image of the object on the image of the background.

7 Claims, 6 Drawing Sheets

IMAGE GENERATING DEVICE, IMAGE GENERATING METHOD, PROGRAM, AND COMPUTER-READABLE INFORMATION STORAGE MEDIUM

BACKGROUND

The present disclosure relates to an image generating device, an image generating method, a program, and a computer-readable information storage medium.

There is a technique in which a landscape or the like is shot by using a camera included in a portable terminal or the like and an image of computer graphics matching the image of the landscape is superimposed to display the image resulting from the superposition by a display device included in the portable terminal or the like (so-called augmented reality technique).

SUMMARY

When an image of three-dimensional computer graphics is superimposed on an image of a background acquired from a camera, the brightness and color of the image of the computer graphics often appear unnatural.

It is desirable to provide a technique enabling a superimposed image of three-dimensional computer graphics to appear more natural for the user when the image is superimposed on an image of a background acquired from a camera.

According to an embodiment of the present disclosure, there is provided an image generating device including a background image acquirer configured to acquire an image of a background on which an image of an object is to be superimposed, a color extractor configured to extract a color about one or a plurality of places in the image of the background, and a light source decider configured to decide the color of light output by a light source that illuminates the object based on the color extracted about the one or plurality of places. The image generating device further includes a drawing section configured to draw the image of the object based on the decided color of the light of the light source and an output image generator configured to generate an output image obtained by superimposing the image of the object on the image of the background.

According to another embodiment of the present disclosure, there is provided an image generating method including acquiring an image of a background on which an image of an object is to be superimposed, extracting a color about one or a plurality of places in the image of the background, and deciding a color of light output by a light source that illuminates the object based on the color extracted about the one or plurality of places. The image generating method further includes drawing the image of the object based on the decided color of the light of the light source and generating an output image obtained by superimposing the image of the object on the image of the background.

According to another embodiment of the present disclosure, there is provided a program for a computer, including acquiring an image of a background on which an image of an object is to be superimposed, extracting a color about one or a plurality of places in the image of the background, and deciding a color of light output by a light source that illuminates the object based on the color extracted about the one or plurality of places. The program further includes drawing the image of the object based on the decided color of the light of the light source and generating an output image obtained by superimposing the image of the object on the image of the background.

According to another embodiment of the present disclosure, there is provided a computer-readable information storage medium storing a program for a computer, the program including acquiring an image of a background on which an image of an object is to be superimposed, extracting a color about one or a plurality of places in the image of the background, and deciding a color of light output by a light source that illuminates the object based on the color extracted about the one or plurality of places. The program further includes drawing the image of the object based on the decided color of the light of the light source and generating an output image obtained by superimposing the image of the object on the image of the background.

According to the embodiments of the present disclosure, in the case of superimposing an image of three-dimensional computer graphics on an image of a background acquired from a camera, an image of computer graphics depending on the image of the background can be superimposed on the image of the background and an output image that results from the superposition and is more natural than the case in which the present configuration is not provided can be output.

In one embodiment of the present disclosure, the image generating device may further include a position decider configured to decide the positions of the plurality of places.

In one embodiment of the present disclosure, the image generating device may further include an object decider configured to decide a display form of the object based on the image of the background. Furthermore, the position decider may decide the positions of the plurality of places based on the decided display form of the object.

In one embodiment of the present disclosure, the position decider may decide the positions of the plurality of places in such a manner that the distance between a place at an endmost position on a predetermined side among the plurality of places and a place at an endmost position on the opposite side to the predetermined side becomes shorter as the object gets farther away from a point of sight.

According to this embodiment, for example it is possible to suppress the occurrence of a phenomenon in which an object existing in a remote sky is affected by a color in a room near the camera to become unnatural.

In one embodiment of the present disclosure, the drawing section may correct the color of the drawn object based on the color of the one or plurality of places extracted by the color extractor.

According to this embodiment, for example the difference between the brightness of the drawn object and the brightness of the background image is corrected, which allows output of an output image that is more natural than the case in which the present configuration is not provided.

In one embodiment of the present disclosure, the light source decider may decide the color of light output by a light source disposed on the front side of the object based further on the brightness of an image acquired by a camera different from a camera to shoot the image of the background.

According to this embodiment, the influence of light that cannot be captured by the background image can be reflected in the image of the object.

DETAILED DESCRIPTION OF THE PREFERRED EMBODIMENT

An embodiment of the present disclosure will be described below based on the drawings. Elements having the same function, of constituent elements that appear, are given the same numeral and description thereof is omitted.

Figure 1:
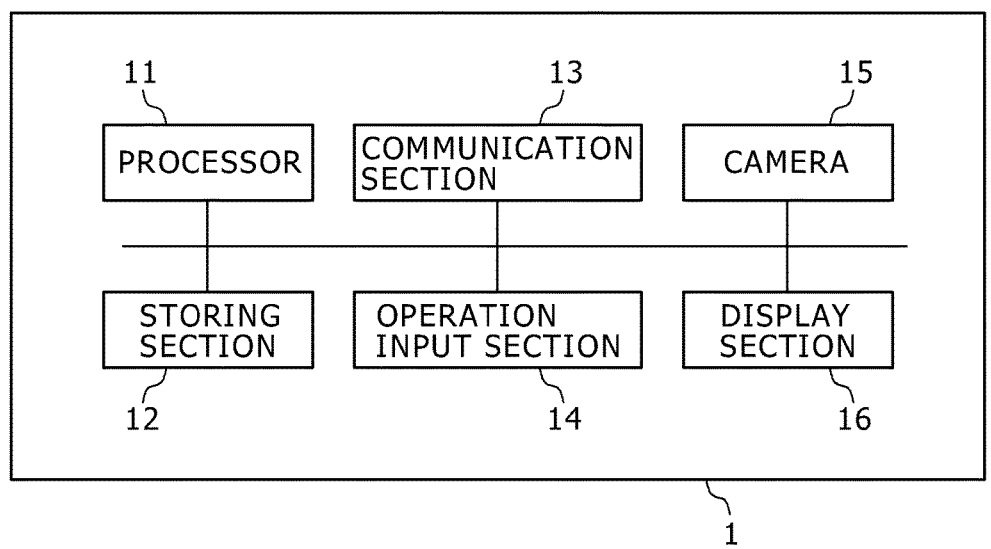
FIG. 1 is a diagram showing one example of the hardware configuration of a portable terminal according to an embodiment of the present disclosure.

FIG. 1 is a diagram showing one example of the hardware configuration of a portable terminal 1 according to the embodiment of the present disclosure. The portable terminal 1 is an information terminal such as a smartphone, a tablet terminal, or a portable game machine. The portable terminal 1 includes a processor 11, a storing section 12, a communication section 13, an operation input section 14, a camera 15, and a display section 16.

The processor 11 operates in accordance with a program stored in the storing section 12 and controls the communication section 13, the operation input section 14, the camera 15, the display section 16, and so forth. The program may be one that is so provided as to be stored in a computer-readable storage medium such as a flash memory or may be provided via a network such as the Internet.

The storing section 12 is formed of a memory element such as a dynamic random access memory (DRAM) or a flash memory. The storing section 12 stores the above-described program. Furthermore, the storing section 12 stores information and arithmetic operation results input from the respective sections.

The communication section 13 is formed of an integrated circuit, an antenna, and so forth that form a wireless local area network (LAN). The communication section 13 has a function to communicate with other devices via a network. The communication section 13 may have a terminal and a circuit for connecting to a wired LAN. Based on control by the processor 11, the communication section 13 inputs information received from other devices to the processor 11 and the storing section 12 and transmits information to other devices.

The operation input section 14 is hardware that detects input from a user and is e.g. a touch panel and buttons. The operation input section 14 detects physical input of the user based on control by the processor 11 and inputs the detected information to the processor 11 and the storing section 12.

The camera 15 includes an imaging element and lenses. The camera 15 shoots an image of things and so forth existing on the front side of the camera 15 based on control by the processor 11 and outputs a signal indicating the image. The camera 15 in the present embodiment shoots only a certain range on the front side of the camera and does not shoot an omnidirectional image.

The display section 16 includes a display output device such as a display and a circuit that controls it. The display section 16 causes the display output device to display an image based on control by the processor 11.

Figure 2:
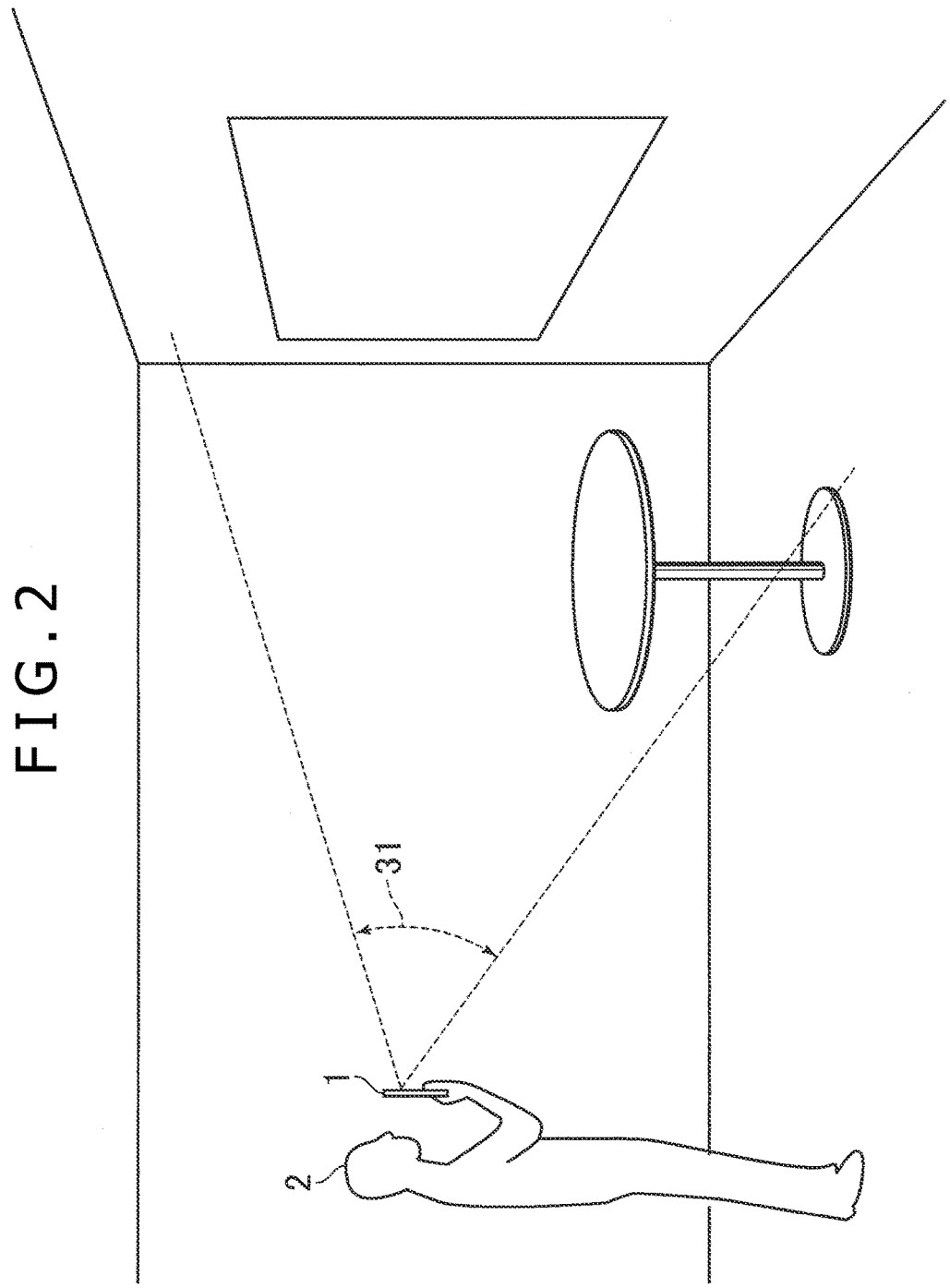
FIG. 2 is a diagram schematically showing one example of the relationship between the portable terminal including a camera and a subject.

Next, the outline of an environment in which the portable terminal 1 according to the present embodiment is used will be described. FIG. 2 is a diagram schematically showing one example of the relationship between the portable terminal 1 including the camera 15 and a subject. A user 2 shoots an image of things such as a table and a window existing in a shooting range 31 by using the camera 15 of the portable terminal 1. The portable terminal 1 employs the shot image as an image of the background and generates data of an output image obtained by superimposing an image of three-dimensional computer graphics on the image of the background. The portable terminal 1 displays the generated output image on the display included in the portable terminal 1 as a built-in component. The image shot by the portable terminal 1 may be either a still picture or a moving picture. What are shot and treated as targets of processing in the present embodiment are things as subjects existing in the shooting range 31 on the front side relative to the camera 15, and an image of a thing outside the shooting range 31 is not used. Furthermore, it is not assumed that a spherical mirror or the like for shooting an image of the outside of the shooting range 31 based on reflection is placed in the shooting range 31.

Figure 3:
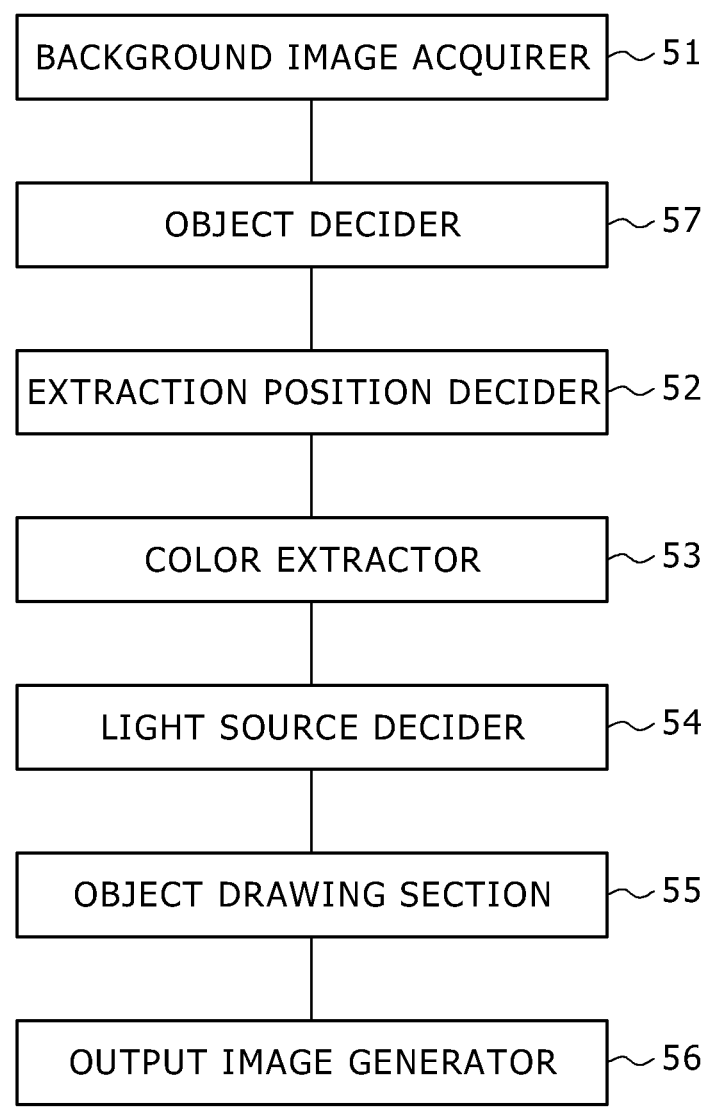
FIG. 3 is a block diagram showing functions implemented by the portable terminal according to the embodiment of the present disclosure.

In the following, a method for implementing the above-described image processing will be described. FIG. 3 is a block diagram showing functions implemented by the portable terminal 1 according to the embodiment of the present disclosure. The portable terminal 1 functionally includes a background image acquirer 51, an extraction position decider 52, a color extractor 53, a light source decider 54, an object drawing section 55, an output image generator 56, and an object decider 57. These functions are implemented through execution of the program stored in the storing section 12 by the processor 11 and control of the operation input section 14, the camera 15, and the display section 16 by the processor 11.

The background image acquirer 51 is implemented mainly by the processor 11, the storing section 12, and the camera 15. The background image acquirer 51 acquires an image of a background (hereinafter, referred to as the "background image") that is an image shot by the camera 15 and on which an image of an object as an image of three-dimensional computer graphics is superimposed. The background image acquirer 51 may acquire an image of each one frame of a moving picture by repeatedly acquiring the background image and may acquire an image of a still picture at a moment specified by the user 2. The background image acquirer 51 shoots, as the background image, an image of things present in the shooting range 31 existing in the shooting direction of the camera 15 as shown in FIG. 2.

The object decider 57 is implemented mainly by the processor 11 and the storing section 12. Based on the background image, the object decider 57 decides the display position, orientation, and so forth (display form) of an object to be superimposed on the background image.

The extraction position decider 52 is implemented mainly by the processor 11 and the storing section 12. The extraction position decider 52 decides the positions of plural places in the background image based on the display position and orientation of the object. These plural places are places where a color is extracted. The extraction position decider 52 may decide the positions of these plural places in such a manner that the plural places exist in a smaller range as the object superimposed on the background image gets farther away from the position of the point of sight in image drawing corresponding to the camera 15. In this case, for example, as the object superimposed on the background image gets farther away from the position corresponding to the camera 15, the distance between the place on the rightmost side or uppermost side (end of a side in a certain direction) among the plural places and the place on the leftmost side of lowermost side (end of the opposite side) may become shorter. The number of places where a color is extracted may be 1.

The color extractor 53 is implemented mainly by the processor 11 and the storing section 12. The color extractor 53 extracts a color about each of the places decided by the extraction position decider 52 in the background image acquired by the background image acquirer 51. The color extracted by the color extractor 53 is the color of a thing existing in the shooting range 31 of the camera 15.

The light source decider 54 is implemented mainly by the processor 11 and the storing section 12. The light source decider 54 decides the color of light output by a light source disposed on the front side of the object in a virtual space based on the color extracted about each of one or plural places.

The object drawing section 55 is implemented mainly by the processor 11 and the storing section 12. The object drawing section 55 draws an image of the object existing in the virtual space based on the decided color of light of the light source. Furthermore, the object drawing section 55 corrects the color of the drawn object based on the color of one or plural places extracted by the color extractor 53. Specifically, the object drawing section 55 corrects the color of the object by multiplying the value of the color of the drawn object by an adjustment value based on the color of one or plural places extracted by the color extractor 53 (e.g. value of luminance average of the color of plural places).

The output image generator 56 is implemented mainly by the processor 11, the storing section 12, and the display section 16. The output image generator 56 generates an output image obtained by superimposing the image of the drawn object on the background image and causes the generated output image to be displayed by the display section 16.

Figure 4:
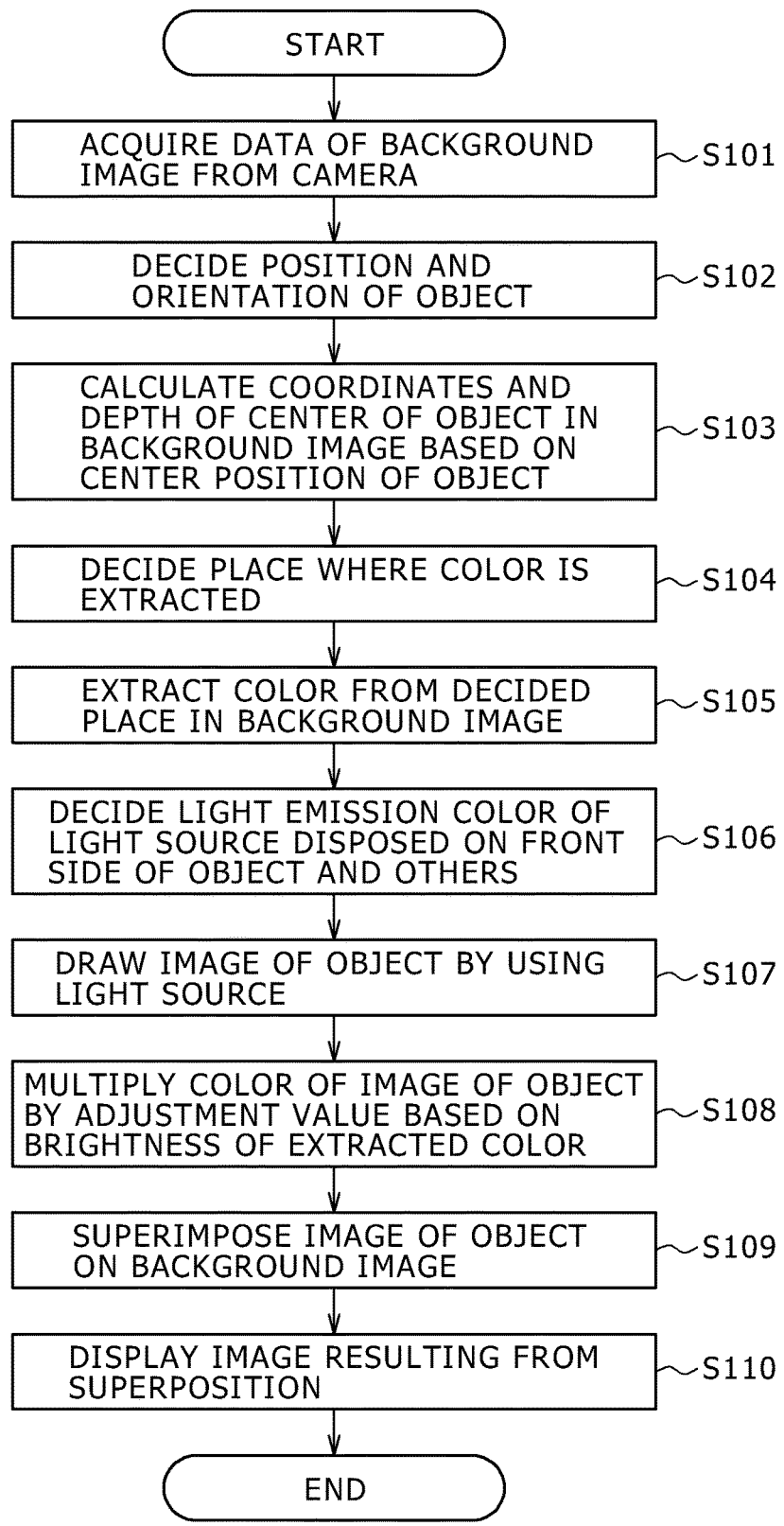
FIG. 4 is a diagram showing one example of a processing flow of the portable terminal according to the embodiment of the present disclosure.

FIG. 4 is a diagram showing one example of the processing flow of the portable terminal 1 according to the embodiment of the present disclosure. In the following, functions implemented by the portable terminal 1 based on the processing flow will be described. In the case of superimposing an object on a moving picture, the processing shown in FIG. 4 is repeatedly executed every time a certain period elapses.

First, the background image acquirer 51 acquires data of a background image shot by the camera 15 (step S101). The camera 15 shoots an image of things existing on the front side (in the shooting direction) relative to the camera 15 as the background image and the background image acquirer 51 acquires data of the background image. In the case of executing the processing for a moving picture, the background image acquirer 51 repeatedly acquires data of the background image every time a certain time elapses, and makes the extraction position decider 52 and so forth execute the subsequent processing every time acquiring the data of the background image.

Figure 5:
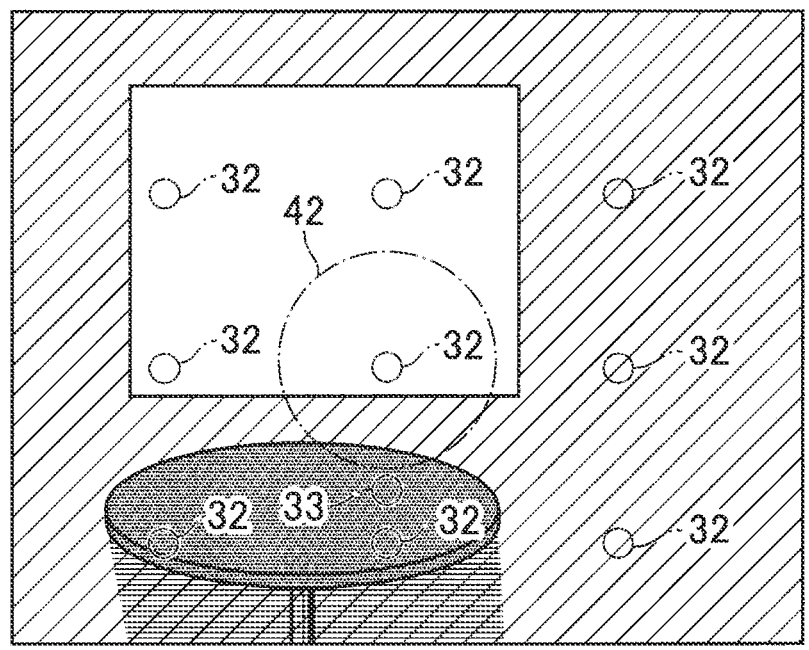
FIG. 5 is a diagram showing one example of a background image acquired by the camera.

FIG. 5 is a diagram showing one example of the background image acquired by the camera 15. The background image shown in FIG. 5 is an image of things in the shooting range 31 in FIG. 2 and is an image of a background on which an image of a three-dimensional object 42 is superimposed. In FIG. 5, extraction regions 32 to be described later, an under extraction region 33, and a virtual position at which the object 42 is disposed are also described. Suppose that, in FIG. 5, the window part is bright and the table has a specific color such as red.

Next, the object decider 57 decides the position, orientation, and so forth of the object 42 in the virtual space based on the background image (step S102). Specifically, the object decider 57 recognizes a thing to serve as a marker (e.g. table in FIG. 5) from the background image and estimates the three-dimensional position and posture of the marker in the real space. Then, the object decider 57 acquires, from the storing section 12, drawing data of an object as content associated with the marker, the relative position of the object with respect to the marker, and the posture of the object, and decides the center position and posture of the object 42 in the virtual three-dimensional space based on the estimated three-dimensional position and posture and the acquired relative position (e.g. vector indicating the relative positions of the object 42 and the table). The image recognition technique to recognize the marker from the background image and the processing of deciding the position of the object 42 corresponding to the marker are publicly-known technique and processing and are also described in e.g. PCT Patent Publication No. WO2013/061504.

Next, based on the center position of the object 42 in the virtual three-dimensional space, the extraction position decider 52 calculates the coordinates and depth of the center of the object 42 in the background image when the image of the object 42 is superimposed on the background image (step S103). The extraction position decider 52 acquires the coordinates indicating the position of the center in the background image e.g. by performing publicly-known perspective transformation by use of the center position of the object 42 in the three-dimensional space and a plane equivalent to the display (background image). Furthermore, the extraction position decider 52 calculates the depth of the center position of the object 42. The depth is equivalent to the z-coordinate in a coordinate system in which the position of the point of sight corresponding to the camera 15 is the origin and the shooting direction is the z-axis. The depth may be the distance between the position corresponding to the camera 15 in the virtual space and the center position of the object 42 in the virtual space. The extraction position decider 52 may further calculate what size the object 42 has in the background image based on the center position of the object 42 and the placement of skeletons, meshes, or the like forming the object 42. The size may be the maximum value or average value of the lengths from the center position to ends of the object 42 in the background image. The center of the object 42 does not need to be exact and it is enough that the center is a position serving as a basis in the object 42.

The extraction position decider 52 decides the place where a color is extracted in the background image based on the coordinates and depth of the center of the object 42 (step S104). The place where a color is extracted may be either a region or a dot. The following description is based on the assumption that the place where a color is extracted is a region (extraction region 32). The number of extraction regions 32 shown in FIG. 5 is nine and the placement of the extraction regions 32 is three rows and three columns. The extraction position decider 52 decides the positions of the plural extraction regions 32 in such a manner that the distance between the extraction region 32 at the endmost position on a side in a certain direction (e.g. upper side or left side) among all extraction regions 32 and the extraction region 32 at the endmost position on the opposite side (e.g. lower side or right side) becomes shorter as the calculated depth becomes larger (object 42 gets farther away from the position corresponding to the camera 15). Furthermore, the extraction position decider 52 may decide the positions of the plural extraction regions 32 in such a manner that the distance becomes shorter as the object 42 becomes smaller.

For example, if the coordinates of the center of the object 42 are defined as (xc, yc) and the depth of the center of the object 42 is defined as z1 and the size of the object 42 is defined as s, the coordinates (x1, y1) of the extraction region on the m-th row and the n-th column are represented by the following expression.

$$x1 = xc + A \times (n-2) \times \frac{\sqrt{s}}{z1}$$
$$y1 = yc + B \times (m-2) \times \frac{\sqrt{s}}{z1}$$

[Expression 1]

In this expression, A and B are constants defined according to the characteristics of the image such as its size. This expression is based on the premise that the coordinates of the center extraction region 32 are the same as the center position of the object 42. However, the extraction position decider 52 may calculate the positions of the plural extraction regions 32 in such a manner as to fix the coordinates of the center extraction region 32 irrespective of the object 42. The extraction position decider 52 decides the positions of the extraction regions 32 in such a manner that the extraction regions 32 except part thereof such as the center one exist outside the part at which the object 42 is drawn.

The extraction position decider 52 also decides the position of the under extraction region 33. The under extraction region 33 is decided at a position that is on the lower side relative to the lower end of the object 42 when the object 42 is drawn in the background image and is on the upper side relative to the extraction region 32 existing on the lowermost side.

Then, the color extractor 53 extracts a color from the decided place in the background image (step S105). Specifically, about each of the decided extraction regions 32, the color extractor 53 acquires a value (e.g. RGB value) obtained by averaging the values of the color in the extraction region 32 as the extracted color. Averaging the values of the color in the extraction region 32 can eliminate the influence of fine patterns of the background image and so forth. Furthermore, in order to eliminate the influence of noise of the background image, the color extractor 53 may extract the color by statistically processing time-series data of the values of the color of each extraction region 32. For example, the color extractor 53 may apply a low-pass filter to the time-series data of the values of the color of the extraction region 32 and employ, as the extracted color, the value of the color at the present timing in the time-series data after the filtering calculated as a result. Alternatively, the color extractor 53 may employ the value of the color acquired by merely averaging the time-series data as the value of the extracted color. Furthermore, the color extractor 53 extracts a color from the under extraction region 33 in the same method as that for the extraction region 32.

Next, the light source decider 54 decides the light emission color of a front light source 43 disposed on the front side of the object 42 (side of the point of sight relative to the object 42) in the virtual space (step S106). Specifically, based on the color extracted about each extraction region 32, the light source decider 54 decides the light emission color about each of the same number of front light sources 43 as the extraction regions 32 disposed on the front side of the object 42. The extraction regions 32 and the front light sources 43 are associated with each other in a one-to-one relationship and the light source decider 54 may decide the color extracted from the extraction region 32 corresponding to a respective one of the front light sources 43 as the light emission color of this front light source 43. Furthermore, the light source decider 54 decides the light emission color of an under light source 44 disposed under the object 42 based on the color extracted from the under extraction region 33 (step S106). The light emission color of the under light source 44 may be the color extracted from the under extraction region 33. The light source decider 54 may decide a color resulting from correction of the brightness and so forth of the color extracted as the light emission color of the front light source 43 or the under light source 44.

Figure 6:
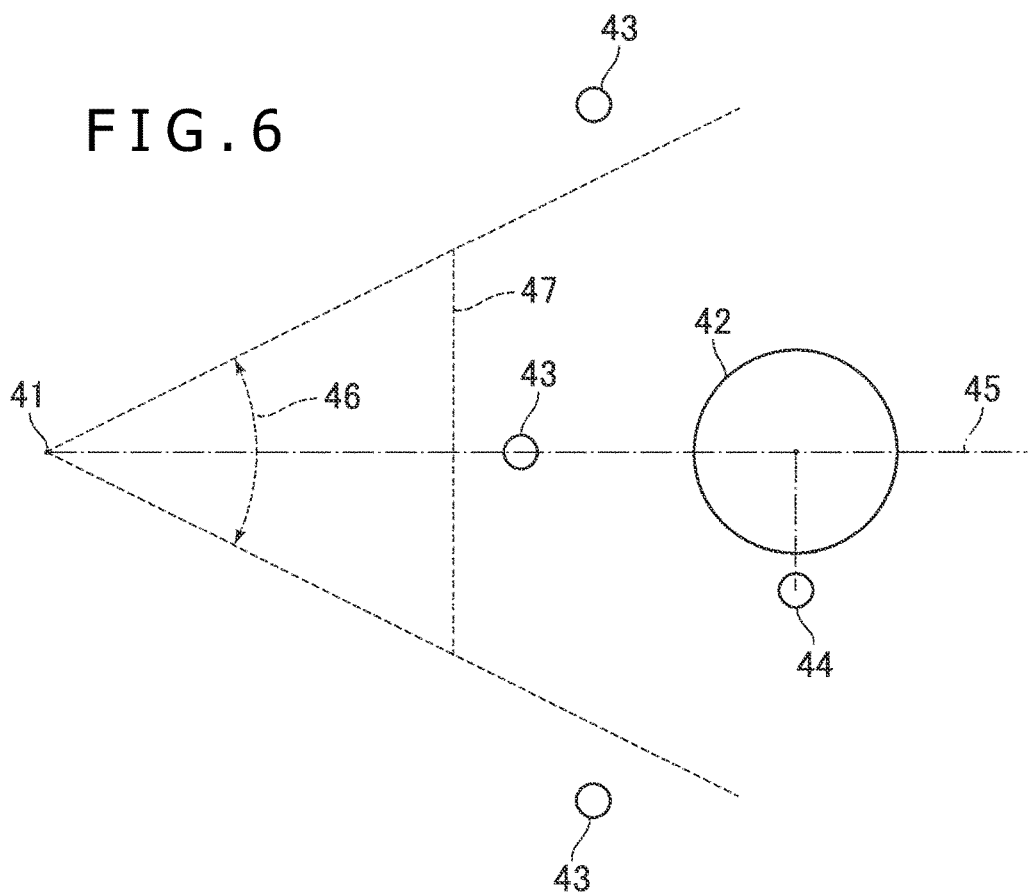
FIG. 6 is a diagram showing one example of the placement of an object to be drawn, the camera, and light sources.

FIG. 6 is a diagram showing one example of the placement of the object 42 to be drawn, a point 41 of sight, and light sources. FIG. 6 is a diagram of the object 42, the front light sources 43, and the under light source 44 in the virtual space as viewed from a lateral side and part of the plural front light sources 43 is omitted. The point 41 of sight in the virtual space indicates the position corresponding to the camera 15. A projection plane 47 is equivalent to the region in which the image is displayed on the display and the image of the object 42 in a drawing range 46 will be drawn later by the object drawing section 55. A center axis 45 is equivalent to the shooting direction of the camera 15 and indicates the direction of the center of the projection plane 47 from the point 41 of sight. Suppose that, in the example of FIG. 6, the object 42 is a spherical body having a surface that scatters light and the drawing range of the projection plane 47 is equivalent to the whole of the background image.

The positions of the front light sources 43 are settled according to the point 41 of sight and the direction of the center axis 45. When the position of the point 41 of sight and the center axis 45 move, the positions of the light sources also move. Specifically, for example the relative position of each of the front light sources 43 with respect to the point 41 of sight is fixed and the position of each front light source 43 is calculated based on the position of the point 41 of sight, the direction of the center axis 45, and the relative position. The relative position may be switched according to the characteristics of the object 42 such as its size and shape. The position of the front light source 43 may be obtained by a function indicating the relative position, specifically e.g. a function of the position of the point 41 of sight, the direction of the center axis 45, and the size of the object 42. The under light source 44 is disposed under the object 42.

Next, the object drawing section 55 draws the image of the object 42 by using the front light source 43 and the under light source 44 (step S107). This processing is so-called rendering processing.

Then, the object drawing section 55 multiplies the value of the color of the image of the drawn object 42 by an adjustment value based on the color extracted about the plural extraction regions 32 and so forth (step S108). The object drawing section 55 acquires the luminance average of the color extracted from the extraction regions 32 and the under extraction region 33 as the adjustment value for example and multiplies the value of the color by this adjustment value. This allows the brightness of the whole of the drawn object 42 to match the background image.

Next, the output image generator 56 generates an output image obtained by superimposing the image of the drawn object 42 on the background image (step S109) and displays the output image resulting from the superposition (step S110).

Figure 7:
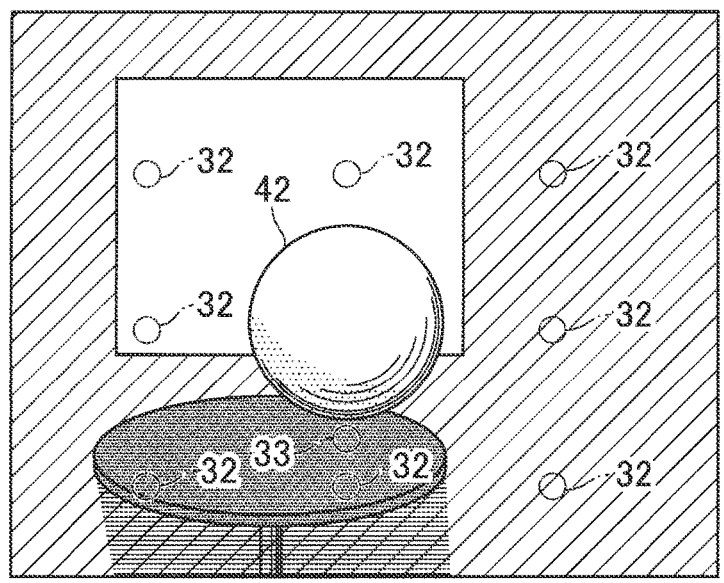
FIG. 7 is a diagram showing one example of an image in which the background image is combined with an image of a drawn object.

FIG. 7 is a diagram showing one example of the output image in which the background image is combined with the image of the drawn object 42. In FIG. 7, corresponding to that the right side and lower side of the background image are dark, the lower right side is somewhat dark also in the image of the object 42 and the tint of the color of the table is also reflected in the color of the object 42. The color of the front side of the object 42 is changed by using a color extracted from the background image, which is a planar image, in other words, a color extracted from the extraction region 32, at least part of which corresponds to the back side of the object 42 in fact. Therefore, this processing does not obey physical laws of reflection and scattering of light. However, ambient colors such as the color of the table as the thing serving as the marker can be reflected to some extent. If the surface of the object 42 is not a mirror surface and has such characteristics as to diffuse and scatter light, even this processing can make the image of the object 42 natural for the user.

The image-based lighting (IBL) is known as a related-art method for drawing an object that accurately expresses physical laws of e.g. reflection based on global illumination. However, in this method, an ambient image as viewed from the position of an object is necessary although even a mirror surface can be accurately expressed. To acquire this ambient image, a special camera like one having a fisheye lens or a spherical mirror needs to be placed at the position of the object 42. Therefore, this method is troublesome for the user and cannot be easily used by the end-user.

In contrast, in the above-described method using the front light source 43 and so forth, the object 42 that is natural can be enjoyed without such troubles. Furthermore, this processing is simple processing using a small number of light sources with respect to the resolution of the background image. Therefore, the processing time is also shorter compared with the IBL and the image of the object 42 can be superimposed on an image shot by the portable terminal 1 in real time.

Furthermore, the extraction position decider 52 decides the positions of plural places in such a manner that these plural places exist in a smaller range as the object superimposed on the background image gets farther away from the position corresponding to the camera 15. Due to this, for example about the image of the object 42 disposed in a remote sky, only the color of the sky near the position of the object 42 in the background image can be reflected and the influence of things near the camera 15 can be reduced. Furthermore, considering also the size makes it also possible to suppress the influence of the color of things other than things under a table about a small object disposed on the back side under the table for example.

The method for deciding the light emission color of the light source by the light source decider 54 is not limited to that described thus far. For example, the light source decider 54 may decide the color in such a manner that the luminance of the color of the front light source 43 corresponding to the extraction region 32 (e.g. center extraction region 32) on the back side of the object 42 is lower than the luminance of the color extracted from this extraction region 32. The possibility that the color of the extraction region 32 existing on the back side of the object 42 is reflected in the color of the front side of the object 42 is lower compared with the colors of the other extraction regions 32. Therefore, the object 42 that is more natural can be drawn in the case of a backlit situation for example. A similar effect may be obtained by omitting provision of the front light source 43 corresponding to the extraction region 32 on the back side of the object 42.

Moreover, if the difference in the luminance between the color extracted from the center extraction region 32 and the color extracted from (the average of) the other extraction regions 32 is larger than a predetermined value and the luminance of the center extraction region 32 is higher than that of the other extraction regions 32, the light source decider 54 may obtain the rim light effect or Fresnel effect by disposing a light source on the back side of the object 42, i.e. on the other side of the object 42 with respect to the point 41 of sight, and irradiating the object 42 with light from this light source. If this is employed, light overflow due to backlight is also expressed.

Furthermore, the light source decider 54 may decide the color of light output by the front light source 43 based further on the brightness of an image acquired by a camera different from the camera to shoot the background image. Specifically, if the portable terminal 1 can shoot images in opposite directions to each other as with apparatus having a front camera and a rear camera, the light source decider 54 may decide the light emission color of the light source by using the images shot by both cameras. For example, the light source decider 54 may adjust the brightness of the front light source 43 if the difference between the average luminance of an image shot as the background image by the rear camera and the average luminance of a reference image shot by the front camera is larger than a threshold. For example, if the reference image is brighter than the background image, light from the front camera side will shine on the front side of the object 42 and thus the light source decider 54 may carry out adjustment to make the color of the front light source 43 bright so that this light shining may be reflected. In the opposite case, the light source decider 54 may carry out adjustment to make the color of the front light source 43 dark.

In addition, the output image generator 56 may output, as the output image, an image obtained by superimposing the object 42 on an image resulting from clipping of the center part of the background image. Moreover, part of the extraction region 32 may exist outside the clipped image. If this is employed, the influence of global illumination outside the displayed screen can also be reflected.

In the above-described embodiment, the case is mainly described in which techniques of the present disclosure are applied to a portable terminal having a camera and a display section. However, the hardware configuration is not limited thereto. For example, a camera and a display section may be provided separately from a computer (stationary game console, personal computer, etc.) that executes image processing. The same processing can be implemented as long as the camera and the display section are connected to the computer.

The present disclosure contains subject matter related to that disclosed in Japanese Priority Patent Application JP 2014-034249 filed in the Japan Patent Office on Feb. 25, 2014, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image generating device comprising:
 a background image acquirer configured to acquire an image of a background on which an image of an object is to be superimposed;
 a color extractor configured to extract a color about one or a plurality of places in the image of the background;
 a light source decider configured to decide a color of light output by a light source that illuminates the object based on the color extracted about the one or plurality of places;
 a drawing section configured to draw the image of the object based on the decided color of the light of the light source; and
 an output image generator configured to generate an output image obtained by superimposing the image of the object on the image of the background,
 wherein the light source decider decides a color of light output by a light source disposed on a front side of the object based further on brightness of an image acquired by a camera different from a camera to shoot the image of the background.

2. The image generating device according to claim 1, further comprising
 a position decider configured to decide positions of the plurality of places.

3. The image generating device according to claim 2, further comprising
 an object decider configured to decide a display form of the object based on the image of the background,
 wherein the position decider decides the positions of the plurality of places based on the decided display form of the object.

4. The image generating device according to claim 2, wherein
 the position decider decides the positions of the plurality of places in such a manner that distance between a place at an endmost position on a predetermined side among the plurality of places and a place at an endmost position on an opposite side to the predetermined side becomes shorter as the object gets farther away from a point of sight.

5. The image generating device according to claim 1, wherein
 the drawing section corrects a color of the drawn object based on the color of the one or plurality of places extracted by the color extractor.

6. An image generating method comprising:
 acquiring an image of a background on which an image of an object is to be superimposed;
 extracting a color about one or a plurality of places in the image of the background;
 deciding a color of light output by a light source that illuminates the object based on the color extracted about the one or plurality of places;
 drawing the image of the object based on the decided color of the light of the light source; and
 generating an output image obtained by superimposing the image of the object on the image of the background,
 wherein a color of light output by a light source disposed on a front side of the object is based further on brightness of an image acquired by a camera different from a camera to shoot the image of the background.

7. A non-transitory computer-readable information storage medium storing a program for a computer, the program comprising:
 acquiring an image of a background on which an image of an object is to be superimposed;
 extracting a color about one or a plurality of places in the image of the background;
 deciding a color of light output by a light source that illuminates the object based on the color extracted about the one or plurality of places;
 drawing the image of the object based on the decided color of the light of the light source; and
 generating an output image obtained by superimposing the image of the object on the image of the background,
 wherein a color of light output by a light source disposed on a front side of the object is based further on brightness of an image acquired by a camera different from a camera to shoot the image of the background.

* * * * *